United States Patent [19]
Sinsky et al.

[11] 3,927,552
[45] Dec. 23, 1975

[54] UNDERWATER STRAIN SENSOR

[75] Inventors: Joel A. Sinsky, Randallstown, Md.; Dorsey J. G. Gregan, Arlington, Va.

[73] Assignee: The United States of America as represented by the Secretary of the Navy, Washington, D.C.

[22] Filed: Nov. 20, 1974

[21] Appl. No.: 525,707

[52] U.S. Cl. ............... 73/1 DV; 73/71.4; 73/DIG. 4
[51] Int. Cl.² ......................................... H04R 29/00
[58] Field of Search ............ 73/1 DV, DIG. 4, 71.4; 340/5 C, 11

[56] References Cited
UNITED STATES PATENTS

| | | | |
|---|---|---|---|
| 2,558,563 | 6/1951 | Janssen | 73/DIG. 4 |
| 2,834,943 | 5/1958 | Grisdale et al. | 340/11 X |
| 3,079,583 | 2/1963 | Beitscher et al. | 73/1 DV |
| 3,089,107 | 5/1963 | Dean | 73/88.5 R X |
| 3,167,150 | 1/1965 | Darby et al. | 73/1 DV |
| 3,750,127 | 7/1973 | Ayers et al. | 73/DIG. 4 |

FOREIGN PATENTS OR APPLICATIONS

| | | | |
|---|---|---|---|
| 1,047,974 | 7/1953 | France | 73/DIG. 4 |

*Primary Examiner*—Charles A. Ruehl
*Attorney, Agent, or Firm*—R. S. Sciascia; Arthur L. Branning; Melvin L. Crane

[57] ABSTRACT

A simple inexpensive underwater strain sensor which can monitor the strain, and parameters which are derived from the strain, of a sonar transducer of suitable geometry. Such a transducer is a radially oscillating, free-flooded, magnetostrictive ring transducer. The ring is assumed to be uniformly round and the circumferential strain in the lowest order purely radial mode is $u/a$ where $u$ is the radial displacement from equilibrium position of any point on the mean radius of the ring and $a$ is the mean radius of the ring. The sensor is a small, rectangular, ceramic slab with its long dimension approximately tangent to the circle of the ring. The sensor ceramic is piezoelectric and emits an electric charge proportional to the circumferential strain of the ring at the location of the sensor. Because the radial displacement, $u$, and hence the radial velocity of the ring are proportional to the circumferential strain, the charge output of the sensor is proportional to the radial velocity of the ring transducer.

2 Claims, 4 Drawing Figures

UNDERWATER STRAIN SENSOR

BACKGROUND OF THE INVENTION

This invention is directed to strain sensors and more particularly to a strain sensor for determining strain of a magnetostrictive transducer.

Heretofore the displacement, velocity and acceleration of underwater sound transducers have been monitored by accelerometers or by optical techniques. Underwater accelerometers are expensive, bulky, and their size and output characteristics are chosen to be compatible with the transducer on which they are mounted. For use on small transducers, or scale models of large transducers, the accelerometers must be small enough not to load the transducer and thereby alter its response. Underwater operation introduces the necessity of insulating coatings or rubber boots to maintain the watertight integrity of the accelerometer. Optical techniques such as holography or interferometry to monitor displacements involve large expensive precision set-ups where the alignment of the transducer's radiating head and the optical system are critical. An underwater optical setup is very difficult to construct because of the instability inherent in the medium.

SUMMARY OF THE INVENTION

This invention makes use of a barium titanate rectangular parallelepiped strain sensor element with suitable leads fed to a charge amplifier and the output of the charge amplifier is connected to a digital voltmeter. The sensor output is directly proportional to the circumferential strain and radial displacement of the ring transducer. The strain sensor element is placed on the transducer ring at the mean radius with its long dimension approximately tangent to the circle of the ring, thus the sensor more accurately measures the desired parameters. The underwater strain sensor is protected in a waterproof housing which is inexpensive and replaces much more expensive and complicated sensing equipment. This invention and related publications are found in an article; "An Underwater Strain Sensor" by J.A. Sinsky and D.J.G. Gregan, in the Report of NRL Progress, page 18, December 1973, published by the Naval Research Laboratory, Washington, D.C. 20375.

DETAILED DESCRIPTION

Figure 1:
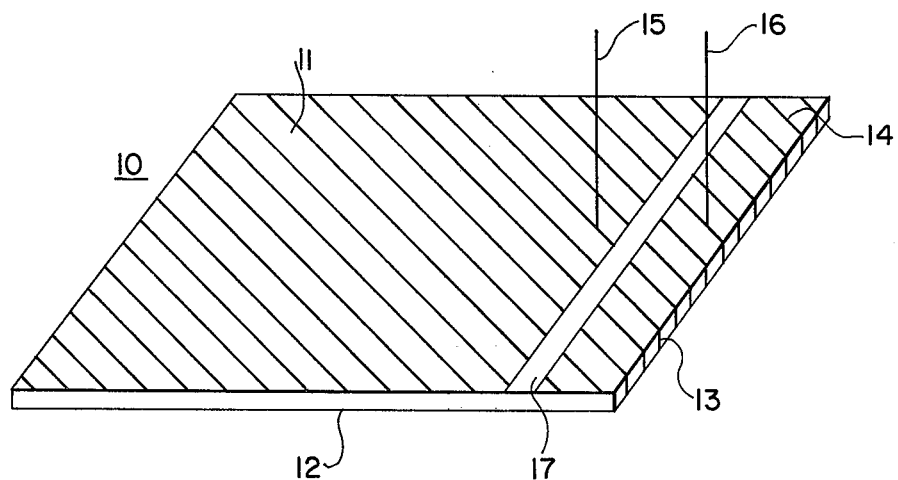
FIG. 1 illustrates a perspective view of the sensor element.
Figure 2:
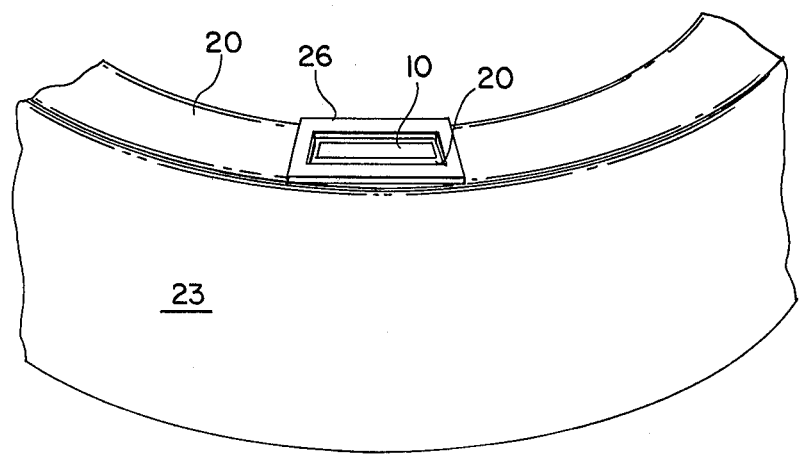
FIG. 2 is a schematic illustrating the sensor secured to a transducer section.

Now referring to the drawings, there is shown for illustrative purposes, a strain sensor element made in accordance with this invention, with the sensor element secured for use on an underwater transducer. As shown, the strain sensor element 10 is a rectangular parallelepiped piezoceramic material such as barium titanate. The upper surface 11 is silver plated over its width along a major portion of its length with the lower surface 12 silver plated over its entire length and width with the bottom plating brought around end 13 onto the upper surface portion 14 so that leads 15 and 16 may be connected to the silver plated conductors on the upper surface. A spacing 17 between the silver plated areas provides an insulating strip between the two different conductor surfaces. The leads 15 and 16 are provided for feeding the output from the sensor element through output lines 18 and 19 to charge amplifier 21 which amplifies the output signal. The output of the amplifier is electrically connected with a voltmeter 22 which indicates a measure of the output. Suitable sensor dimensions are ¾ inch in length $x$ ⅛ inch in width by 0.015 inch in thickness. In use, the sensor element is applied or bonded to the edge surface 20 of a ring type magnetostrictive transducer 23 by use of a bonding cement which electrically insulates the sensor from the surface and centered about the mean radius with its long dimension approximately tangent to the circle of the ring, as shown schematically in FIG. 2.

Figure 3:
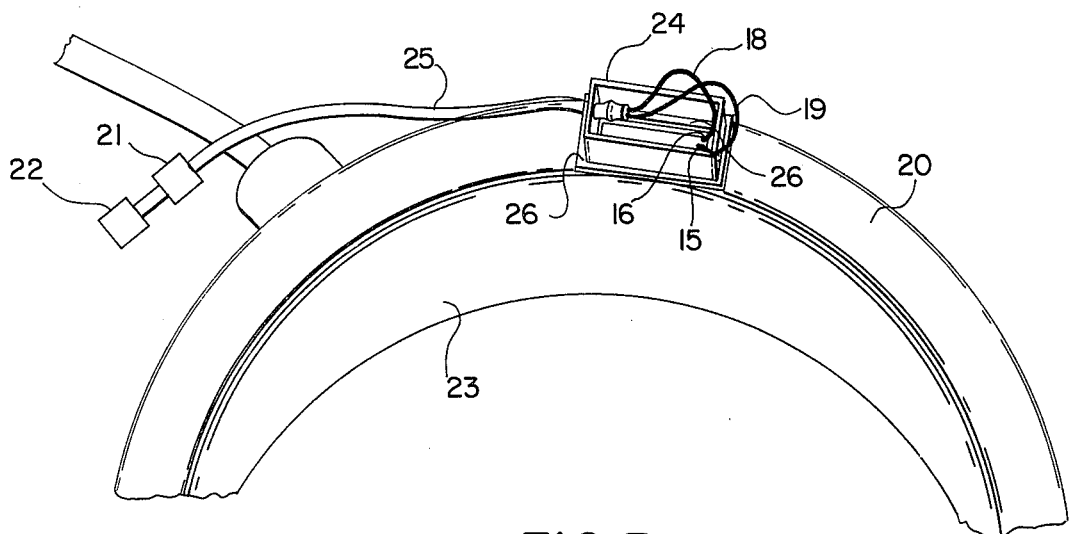
FIG. 3 illustrates the sensor secured to a section of a transducer within a housing.

The sensor element after being secured to the transducer is kept dry by enclosing it in a watertight, sealed stiff copper can 24 or housing as shown in FIG. 3. The housing includes a closed bottom with an open top which is turned upside down over the sensor element to provide a closure. The closed bottom is not shown in FIG. 3. The outside dimensions of the can are ½ inch × 1 inch × ½ inch and the wall thickness is 0.050 inch. An electrical conductor shielded cable 25 passes through a 0.106-inch-diameter hole which has been drilled through one end of the can and the leads 18 and 19 are connected to the sensor leads 15 and 16. The opposite ends of the conductors 18 and 19 are electrically connected to the amplifier 21. The cable is secured to the housing by use of a watertight connector which also insulates the cable from the housing.

A watertight fit between the housing 24 and the transducer 23 is provided by the following procedure:

1. A ⅛-inch-thick soft piece of rubber gasket 26 is cut to fit around the sensor element and trimmed to the contour of the ring transducer's curvature. Its overall dimensions are approximately 9/16 inch × 1⅛ inches.

2. One coat of rubber cement is applied to the surface of the transducer and to the rubber gasket and allowed to air-dry; a second coat is applied to both surfaces and when it has air-dried until tacky, the rubber gasket is pressed onto the transducer surface.

3. The conducting cable is run through the hole in the can and soldered to the sensor leads.

4. One coat of rubber cement is applied to the top of the rubber gasket and to the bottom edge of the can and both allowed to air-dry; a second coat is applied to both surfaces and when it has air-dried until tacky, the can is pressed onto the rubber gasket. A weight is placed on the can until all of the cemented surfaces have completely air-dried.

5. Two coats of rubber cement are applied to the entire can, the exposed part of the rubber base, the cable and the transducer surface adjacent to the can. Particular care is taken to thoroughly coat the can and cable at the hole where the cable enters the can.

6. At least two coats of vinyl are applied over all of the rubber coated surfaces. The vinyl provides a hard glossy air-free covering to the entire assembly.

The watertight integrity of the submerged scaled sensor may be tested by measuring the d.c. electrical resistance of the sensor leads to a chlorinated water environment with an ohmmeter. The resistance will remain infinite as long as no water has leaked to the sensor.

A sonar transducer particularly suitable for application of the strain sensor element is a NRL developed radially oscillating free-flooded magnetostrictive ring transducer as set forth in NRL Report 7328, "Acoustic Near-Field Measurements of a Free-Flooded Magnetostrictive Ring" by J.A. Sinsky, December 1971, AD737615.

Figure 4:
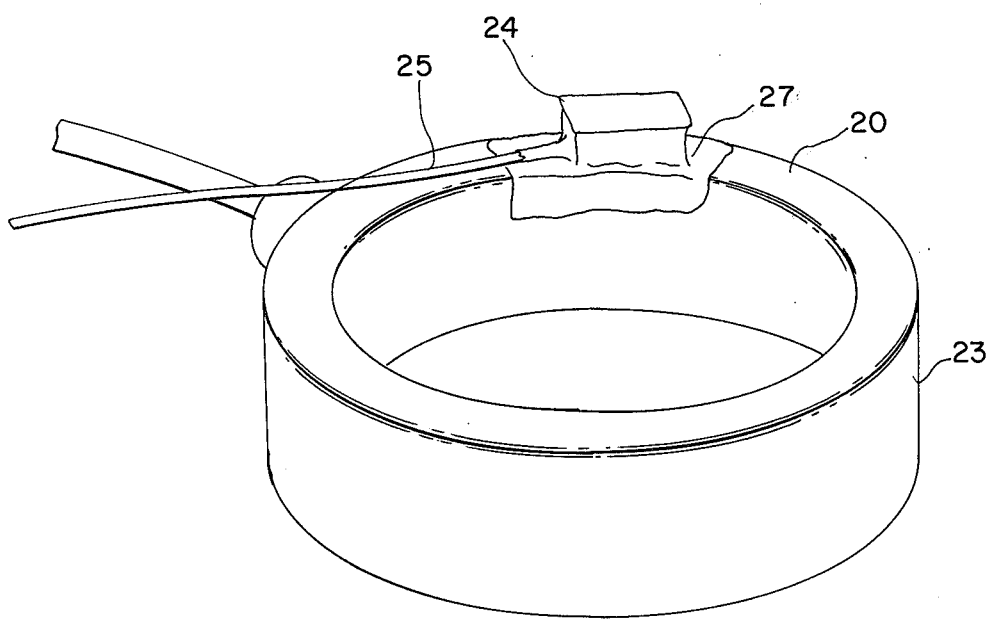
FIG. 4 illustrates a transducer with the sensor within a waterproof housing secured to the transducer.

The ring is assumed to be uniformly round, and the circumferential strain at the mean radius, a, of the ring in the lowest order purely radial mode is $u/a$, where $u$ is the radial displacement from equilibrium position of any point on the mean radius of the ring. FIG. 4 shows a magnetostrictive ring transducer with an encapsulated watertight strain sensor mounted on its edge. The sensor is epoxied to the edge surface of the ring and is centered about the mean radius with its long dimension appproximately tangent to the circle of the ring. Because the sensor has finite dimensions, it does not measure strain at a point on the ring but integrates the strain over the area of contact with the ring. The circumferential strain at a radial distance $r$ from the center of the ring is inversely proportional to $r$, and any ring with a large enough diameter to accommodate the sensor on its edge will have negligible variation in circumferential strain over the area of contact with the sensor. Therefore, to a first approximation, the circumferential strain under the sensor is uniform and equal to the strain at the mean radius of the ring. Because the sensor ceramic is piezoelectric, it emits an electric charge proportional to the circumferential strain and, hence, to the radial displacement of the ring at the location of the sensor. The sensor response is measured to be linear with the transducer driving current when the transducer is operated in a free-field environment, and there is a constant phase shift at all frequencies of operation below 20 kHz between the driving current and the sensor response. The sensor on the ring may be used for the following specific purposes:

1. The sensor output is a linear function of ring radial velocity amplitude because the velocity amplitude is $2\pi fu$, where $f$ is the frequency of excitation of the ring and $u$ is the radial amplitude. The sensor can thus be used as a monitor of ring velocity under varied conditions of loading and drive of the ring transducer.

2. Properly calibrated sensors permit the regulation of the radial velocities of individual ring elements in an array to achieve a designated array radiation pattern.

3. The change in phase and amplitude of the signal from the strain sensor on the ring under different conditions of loading may be used to calculate the change in radiation impedance of the transducer under different load conditions.

4. The sensor serves as an independent indicator of the transduction characteristics of the ring, namely, linearity of surface velocity with driving current, repeatability of response over periods of extended use, and conformity of response to the predictions of the one-dimensional mathematical model of the ring transducer.

The underwater strain sensor can also be used as a velocity monitor on other transducers such as longitudinal resonators and "benders."

In operation, the sensor element is secured to a transducer and connected to an amplifier and voltmeter as set forth above. The sensor element generates a voltage in accordance with the well known principles of an active piezoceramic material of which it is. The sensor element output is fed directly to the charge amplifier and the amplifier output of the charge amplifier is connected electrically to the voltmeter which indicates a measure of the charge output. The measured response of the sensor element is linear with the transducer driving current when the transducer is operated in a free-field environment and there is a constant phase shift at all frequencies of operation below 20 kHz between the driving current and the sensor response. The sensor output is directly proportional to the circumferential strain and radial displacement of the ring transducer. One limitation of the strain sensor is that it monitors only relative strain, displacement, velocity, and acceleration and cannot be used to determine the absolute values of these parameters. However, where only relative values are required or where it is convenient to absolutely calibrate a strain sensor, it is a much cheaper and simpler alternative available to the transducer engineer. The uncalibrated underwater strain sensor can be used to determine the absolute value of the radiation impedance of a single degree of freedom transducer.

Any active piezoceramic material may be used for the sensor element. The size of the element is determined according to the size of the transducer and the desired sensor electrical output.

Obviously many modifications and variations of the present invention are possible in light of the above teachings. It is therefore to be understood that within the scope of the appended claims the invention may be practiced otherwise than as specifically described.

What is claimed and desired to be secured by letters patent of the United States is:

1. A method of monitoring output parameters of a magnetostrictive type ring transducer which comprises:
    securing a piezoceramic strain sensor element onto said ring transducer on an edge surface centered about the mean radius with its long dimension approximately tangent to the circle of said ring;
    enclosing said strain sensor element within a waterproof housing; and
    electrically connecting said strain sensor element to a charge amplifier and voltage measuring device which indicates activity of said ring transducer.

2. A method as claimed in claim 1, in which:
    said housing enclosure includes a rubber base cemented to said transducer surfaces surrounding said strain sensor element with a rigid housing secured thereto; and
    a rubber covering, covering said housing and a portion of said transducer surface.

* * * * *